May 24, 1960 A. KÜHN 2,937,822
SPACING DISPATCH CARRIERS IN PNEUMATIC TUBE SYSTEM
Filed Dec. 4, 1956 3 Sheets-Sheet 1
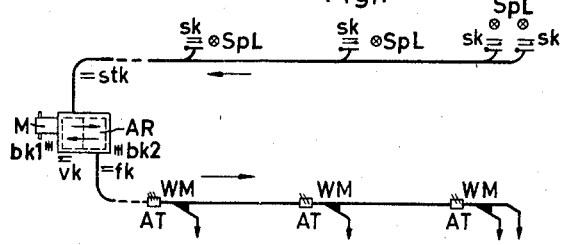
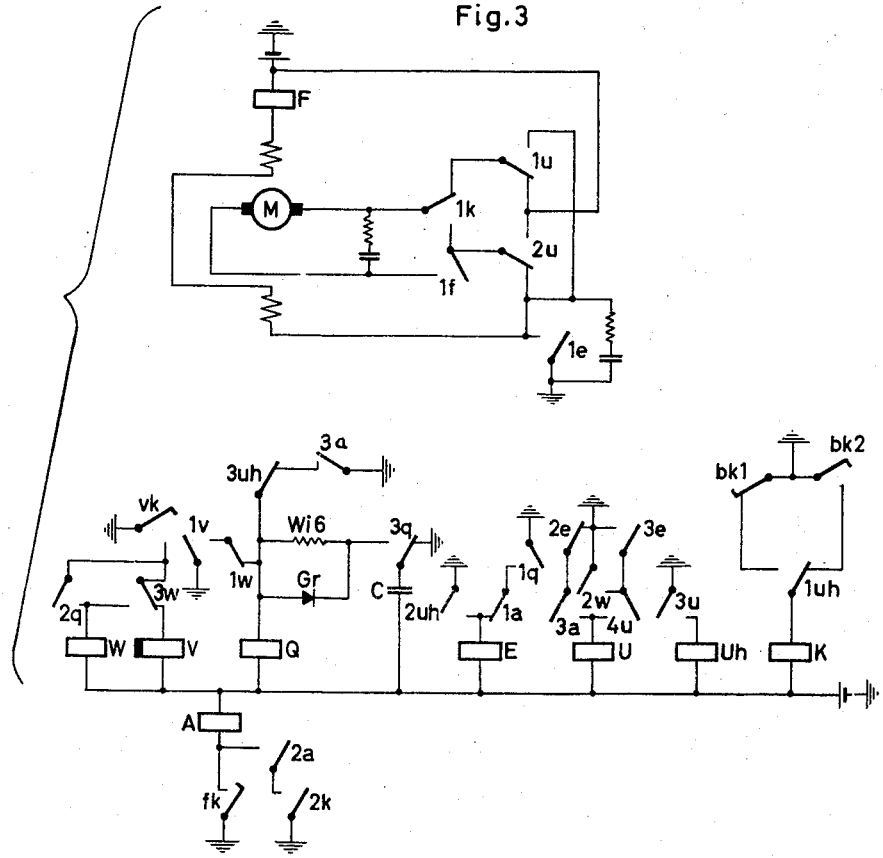
Inventor:
Alfred Kühn _United States Patent Office_

2,937,822
Patented May 24, 1960

2,937,822

SPACING DISPATCH CARRIERS IN PNEUMATIC TUBE SYSTEM

Alfred Kühn, Berlin-Siemensstadt, Germany, assignor to Siemens & Halske Aktiengesellschaft, Berlin and Munich, Germany, a corporation of Germany Filed Dec. 4, 1956, Ser. No. 626,217

Claims priority, application Germany Mar. 3, 1956

13 Claims. (Cl. 243—29)

The present invention relates to an arrangement for regulating the distance apart in travel of pneumatic dispatch carriers and for transferring carriers into a dispatch tube with a different operating pressure, in a switch-type pneumatic tube system, the switches of which are controlled by adjustable characteristics or markings of the pneumatic dispatch carriers and the dispatching and receiving stations of which are located on separate dispatch tubes connected with each other by a sluice.

In such pneumatic tube systems, there are provided in front of the individual receiving switches scanning places for determining the destination which has been set on dispatch carriers to control the position of the switches. This means that a subsequent dispatch carrier may reach the scanning place of a switch only after the previous carrier has paseed through the switch of the scanning place and the switch has again moved back. In order to assure this necessary distance apart of the carriers, there is required in front of the dispatch tube leading to the receivers a spacing controller which permits the carriers to enter the receiver pneumatic tube only at such time intervals that the carriers do not overtake each other and the minimum spacing between two carriers is secured. Such pneumatic tube installations are constructed so that the dispatching pneumatic tube is operated with suction while the receiving pneumatic tube is operated with compressed air. Before entering the receiving pneumatic tube, the carriers must therefore pass through an airlock or sluice which separates the airstream in receiving tubing from the airstream in the dispatching tube. Up to the present time, it was accordingly necessary to provide a suction-airlock and a pressure airlock in back of the travel spacing controller. These apparatus which are arranged one in back of the other require in customary systems a structural height of about 3 meters.

The present invention reduces the structural height to about one-eighth of the previously required height, and at the same time effects a considerable reduction in the cost of the apparatus by utilizing the spacing controller so as to operate as pneumatic tube airlock.

These advantages are attained in accordance with the invention by the provision of a structure acting as spacing controller and sluice, comprising a casing containing a slide with a lock chamber which is linearly reciprocated by a motor controlled by travel contacts for alternately connecting the dispatching and receiving lines which are disposed staggered on each other to the casing with the lock chamber. The slide is moved by a motor-driven screw spindle in screw engagement with a nut disposed in the slide. The nut is resiliently fastened and comprises a threaded bushing which is held in a rubber buffer fastened on the slide. The motor driving the screw spindle is also resiliently fastened on the casing of the slide, and the screw spindle is connected with the motor shaft by a flexible clutch. As a result of the resilient mounting of the cooperating drive parts, inaccuracies in the installation of these parts can easily compensate for each other.

The controlling of the motor by travel contacts and connection with limit contacts which characterize the two end positions of the slide is effected, in accordance with a further feature of the invention, so that the slide after reaching the departure position, and after the departing of the dispatch carrier, is immediately returned again into the incoming position. The manner in which this is effected in detail will be presently explained.

So-called circular chamber drum sluices are known comprising a motor-driven turnable member, such member being provided with a lock chamber for receiving the incoming dispatch carrier and closing of the incoming and departing pneumatic tubes from each other, but these known circular chamber drums do not have the purpose of regulating the distance apart of the carriers in travel but rather serve as dispatching or receiving apparatus for pneumatic tube systems which are operated with suction or compressed air. There are also known drum switches comprising a turnable drum provided with a receiving chamber for the dispatch carrier which can be connected with the incoming and outgoing pneumatic tubes depending upon the destination marking borne by the carrier which has moved into the drum. These drum switches, however, do not serve for regulating the distance apart of the carriers. It would be conceivable to use a drum switch as spacing controller, but the use of a slide instead of a drum is considerably more favorable since the slide is flat as compared with the drum and therefore takes up less space.

An embodiment of the invention will now be described with reference to the accompanying drawings in which Fig. 1 shows the tube layout of a pneumatic tube system;

Fig. 3 shows a circuit diagram for controlling the motor which drives the slide.

As will be seen from Fig. 1, the spacing controller AR is located between the dispatcher and the receiving tubing. For the individual dispatchers, not shown in detail, there are indicated merely the dispatcher contacts *sk* and the stop lamps *SpL*. Upon opening of a corresponding dispatcher cover, the dispatcher contact is closed and the blower is placed in operation. If the number of dispatch carriers sent out in quick succession becomes too great, they accumulate above the spacing controller AR and actuate the pile contact *stk*. By means of this contact, the stop lamps at the dispatchers are connected, indicating that dispatch of further carriers should be delayed. The carrier entering the space controller is moved, by a slide which will be described in further detail with reference to Fig. 2, to the receiver tube and enters it.

Before dispatching the carrier, the destination is marked by displacing contact rings provided thereon. In front of each receiving switch WM, there is a scanning position AT at which the destination marked on the carrier is determined and the switch WM is correspondingly set for straight ahead or for branching off.

The dispatch tube is operated by suction while compressed air passes through the receiver tube.

Figure 2:
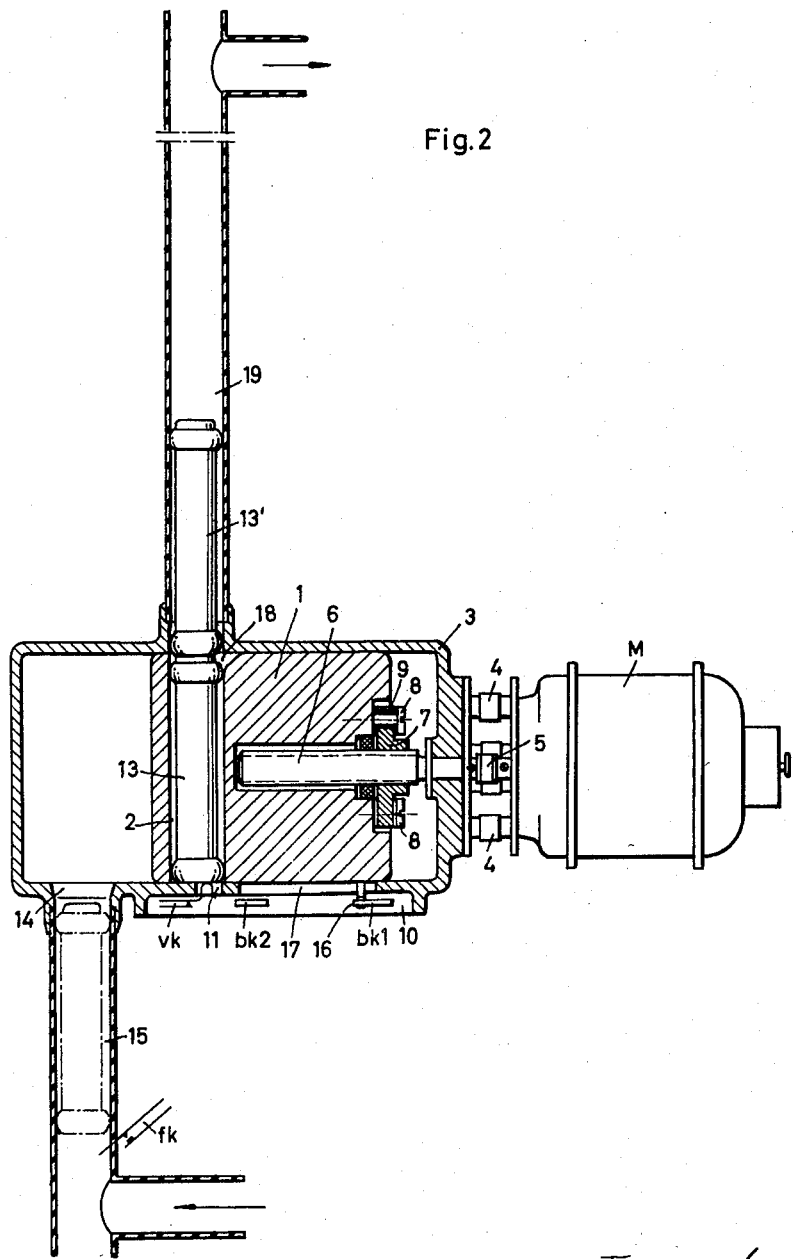
Fig. 2 is a section through the spacing controller.

The spacing controller shown in Fig. 2 comprises a slide 1 which has a bore 2 serving as an airlock chamber and the length of which corresponds to the length of one dispatch carrier. The slide 1 is driven by a reversible motor M which is resiliently fastened to the casing 3 and rests on rubber bushings 4 connected with the casing 3. The shaft of the motor is connected by means of a flexible clutch 5 with the screw spindle 6 engaged by a nut 7 flexibly fastened to the slide 1. The nut 7 is fastened to the slide 1 by means of screws 8 extending through rubber bushings 9. The casing 3 forms at its lower part a recess 10, in which are disposed control or preparation contact $vk$ and two limiting contacts $bk1$ and $bk2$. A part of a spring of contact $vk$ extends through a hole 11 of the casing 3 and is moved into actuated position by the dispatch carrier 13 positioned in the lock chamber 2. As will be explained with reference to Fig. 3, due to the closing of the contact $vk$, the motor M is caused to operate, so that by means of the rotating screw spindle 6, the slide 1 is moved forward linearly until the bore 2 (airlock chamber) is located over the opening 14 in the casing 3. The receiving pneumatic tube 15 extends from this opening 14. The carrier 13 therefore travels into the tube 15 and actuates the travel contact $fk$.

Responsive to actuation of travel contact $fk$, the motor M is again started but its polarity is reversed so that it rotates the screw spindle 6 in opposite direction of rotation. As soon as the slide 1 reaches the position marked by contact $bk1$, the motor will be disconnected and simultaneously braked by short-circuiting the armature. The two limit contacts $bk1$ and $bk2$ which mark the end or limit positions of the slide are actuated by a stop 16 carried by the slide 1 and extending through a slot 17 in the casing 3 into the recess 10.

In order to compensate for tolerances in the length of the carriers such as 13, the airlock chamber 2 is somewhat longer than the length of a carrier and is beveled at the entrance end as indicated at 18. A carrier 13' coming into the controller and having its head end extending slightly into the airlock chamber 2 is therefore raised by the bevel 18 upon the movement of the slide and cannot retard the motion thereof.

The two limit positions of the slide, at which the airlock chamber 2 will be either below the incoming pneumatic tube 19 or above the outgoing tube 15, must be fixed as accurately as possible, and the limit contacts $bk1$ and $bk2$ are for this reason fastened in an adjustable manner in the contact recess or chamber 10.

It would be conceivable to precisely fix the limit positions of the slide by stops in the casing 3. However, this would require provision of a slip clutch between the screw spindle and the motor shaft so that the motor could run down after the slide has already reached the end position.

Figure 4:
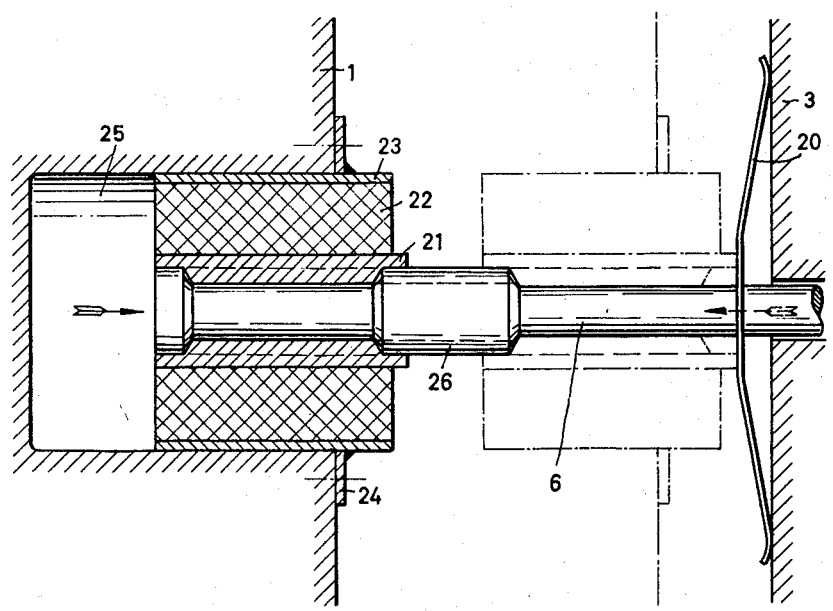
Fig. 4 shows an embodiment of the slide the end positions of which are limited by stop springs.

As shown in Fig. 4, it is also possible to determine the two limit positions of the slide by spring means 20 which are pressed together upon the running of the motor beyond the end position. Fig. 4 also shows that the threaded nut 7 of Fig. 2 can be replaced by a threaded bushing 21 which is force-fitted in a rubber bushing 22 disposed within a tubular member 23 provided with a flange 24 welded onto it. The tubular member 23 is inserted in the bore 25 of the slide 1 and is fastened to the slide body 1 by the flange 24 by means of screws not shown in the drawing. Instead of a continuous screw spindle 6 as in Fig. 2, the spindle of Fig. 4 is provided with the thread 26 only over a portion of its length which is so dimensioned that the thread 26 upon reaching the end position of the slide comes out of engagement with the threaded bushing 21. However, the slide is held by the spring 20 in such a manner that the thread 26 immediately again grasps the thread 21 as soon as the direction of rotation is reversed.

The control of the motor M will now be described with reference to Fig. 3. The time interval between two successive carriers is determined by the sliding time of the slide in the spacing controller. This sliding time can be set with the aid of a variable resistor by changing the speed of rotation of the motor within a wide range of about 2 to 12 seconds.

As already mentioned, the preparation contact $vk$ is closed by the carrier which enters the spacing controller. This causes operation of slow-to-release relay V in a circuit:

(1) From battery—V—$3w$—$vk$ to ground.

By means of the contact $1v$ of relay V, the holding relay Q is energized in a circuit:

(2) From battery—Q—$1w$—$1v$ to ground.

Over contacts $1q$ and $1a$, the connecting relay E is energized in a circuit:

(3) From battery—E—$1a$—$1q$ to ground.

The attraction of relay Q caused energization of relay W over contact $2q$, relay W closing a holding circuit for itself over contact $3w$ independently of contact $2q$. Contact $1w$ opens the circuit for relay Q so that the relay Q releases with a considerable time delay since the capacitor C can discharge over contact $3q$ in a circuit:

(4) From battery—Q—$Wi6$—$3q$—C.

By this capacitor discharge, the relay Q is held for about 2 seconds and within this interval, the slide of the spacing controller should have been moved from the incoming position into the outgoing position. Over contact $1e$, the field winding of the motor M is connected in a circuit:

(5) From battery—F—field winding of the motor—$1e$ to ground.

In this circuit, the field control relay F is energized and its contact $1f$ connects the armature winding of the motor M in a circuit:

(6) From battery—$1u$—$1k$—M—$1f$—$2u$—$1e$ to ground.

The motor now starts and drives the screw spindle 6, Fig. 2, to move the slide 1 from the illustrated incoming or receiving position, at the same time opening the limit contact $bk1$ which until then had been actuated. The slide finally reaches the outgoing position and actuates the limit contact $bk2$, thereby energizing relay K in a circuit:

(7) From battery—K—$1uh$—$bk2$ to ground.

Contact $1k$ short-circuits the armature of the motor so that the motor and thus the slide immediately come to a stop. In this position, the carrier 13 is above the outgoing tube 15 (Fig. 2) and the carrier enters such tube. Upon leaving the spacing controller, the carrier actuates the travel contact $fk$ which causes the outgoing control relay A to be energized in a circuit:

(8) From ground—$fk$—A to battery.

Relay A is held over its own contact $2a$ and contact $2k$ of relay K since contact $fk$ is only briefly closed. Contact $1a$ opens the circuit for the relay E which deenergizes, opening contact $1e$ to disconnect the motor.

Relay U is attracted upon deenergization of relay E, in a circuit:

(9) From battery—U—$3a$—$2e$ to ground.

Relay U is held over its own contact $4u$ and contact $2w$ and its contact $3u$ causes energization of relay Uh. Upon attraction of relay Uh, relay K is deenergized. Contacts $1u$ and $2u$, reverse the polarity of the armature of the motor in the no-voltage condition thereof. The connecting relay E is again energized over the contact $2uh$ upon energization of relay Uh. Contact $3uh$ opens the charging circuit for the capacitor C which was formed upon the dispatch of the carrier by the closure of contact $3a$ responsive to attraction of the relay A. The rectifier Gr connected in parallel to the resistor $Wi6$ effects rapid charging of the capacitor C so that relay Q is again caused to release for the purpose of supervising the duration of the return run of the slide.

The circuit for the relay A is also interrupted by contact $2k$ upon release of relay K. After the release of relay A, relay E can again energize and thus connect the field winding of the motor. The motor now runs in opposite direction of rotation and moves the slide of the spacing controller into incoming position. As soon as the slide leaves the outgoing position, contact $bk2$ is returned into the normal position. Upon reaching the incoming position, the limit contact $bk1$ is actuated so that the relay K is again attracted and short-circuits the motor armature. During the return of the slide into the incoming position, the preparation contact vk is again released since its actuating spring can again extend into the hole of the slide. Relay V accordingly releases as soon as the contact vk opens.

As soon as the capacitor C has discharged over the relay Q, relay Q releases and over its contact 1q again disconnects the relay E. Relays U and Uh are therefore also disconnected. Only when the contact vk is again actuated by a further carrier entering the spacing controller can the motor M again be started.

Changes may be made within the scope and spirit of the appended claims.

I claim:

1. In a pneumatic dispatch carrier system having an incoming dispatch tube operated by suction air and an outgoing dispatch tube operated by compressed air, a device disposed between the incoming and outgoing dispatch tubes for effecting transfer of a carrier from said incoming dispatch tube to said outgoing dispatch tube in a position thereof in which it is isolated from the respective airstreams in said tubes, said device operatively mounted for the separation of the incoming dispatch tube and the outgoing dispatch tube with respect to the airstream in the respective incoming and outgoing dispatch tubes and comprising a casing defining an interior chamber with a clearance between two opposite sidewalls which correspond substantially to the length of a carrier to be transferred, means for connecting said incoming dispatch tube to one of said sidewalls, means for connecting said outgoing dispatch tube to the opposite sidewall at a point laterally spaced with respect to said incoming dispatch tube, a slide disposed movably within said chamber and having a bore formed therein, a motor for reciprocating said slide to effect cyclically alignment of said bore axially respectively with said incoming dispatch tube into position for receiving a carrier therefrom and thereafter axially with said outgoing dispatch tube to transfer said carrier to said outgoing dispatch tube, said slide functioning in the nature of an airlock which isolates the airstreams in the respective dispatch tubes incident to transfer of said carrier, a control circuit for governing the operation of said motor, contact means respectively controlled by the carrier received in said bore for transfer and by said slide, for governing the actuation of said control circuit, said outgoing dispatch tube including serially related receiving tubes, said control circuit also including associated scanning positions at which the destination marked on the carrier is determined and associated receiving switches, whereby the carrier rapidly moving with respect to the scanning positions is operative for controlling the setting of the successively disposed receiving switches or may run through, and the time between scanning of the carrier markings, setting and restoring of the respective receiving switch is to be less than the time determined by the device for the spacing, and the period of time determined by said device cyclically controlled by the motor reciprocating the slide.

2. In a pneumatic dispatch carrier system according to claim 1, wherein said device comprises a screw spindle driven by said motor and operatively connected to said slide to reciprocate said slide, and a nut carried by said slide and engaged by said screw spindle.

3. In a pneumatic dispatch carrier system according to claim 1, wherein said device comprises a screw spindle driven by said motor and operatively connected to said slide to reciprocate said slide, a nut carried by said slide and engaged by said screw spindle, and means for resiliently fastening said nut to said slide.

4. In a pneumatic dispatch carrier system according to claim 1, wherein said device comprises a screw spindle driven by said motor and operatively connected to said slide to reciprocate said slide, a nut carried by said slide and engaged by said screw spindle, and means for resiliently mounting said motor on said casing.

5. In a pneumatic dispatch carrier system according to claim 1, wherein said device comprises a screw spindle driven by said motor and operatively connected to said slide to reciprocate said slide, a nut carried by said slide and engaged by said screw spindle, means for resiliently mounting said motor on said casing, and resilient clutch means for coupling the shaft of said motor with said screw spindle.

6. In a pneumatic dispatch carrier system according to claim 1, wherein said device comprises additional contact means actuated by said carrier upon transfer thereof into said outgoing dispatch tube, and relay means controlled by said additional contact means for operating said motor to return said slide to receiving position with the opening therein in alignment with said incoming dispatch tube.

7. In a pneumatic dispatch carrier system according to claim 1, wherein said device comprises a screw spindle driven by said motor and operatively connected to said slide to reciprocate said slide, a nut carried by said slide and engaged by said screw spindle, and means for shunting the armature of said motor to brake operation thereof upon said slide reaching a limit position within said chamber.

8. In a pneumatic dispatch carrier system according to claim 1, wherein the length of said bore in said slide exceeds the length of the carrier received therein from said incoming dispatch tube, the inlet end of said bore being beveled, said beveled end being upon motion of said slide to transfer said carrier to said outgoing dispatch tube operative to raise a successive carrier arriving in said incoming dispatch tube so as to execute its transfer motion freely and without being impeded by said successive carrier.

9. In a pneumatic dispatch carrier system according to claim 1, comprising control means for governing the successive reversal of said motor to reciprocate said slide, said control means comprising contacts controlled by said control circuit means for reversing the circuit of said motor in no-current condition thereof.

10. In a pneumatic dispatch carrier system according to claim 9, wherein said slide-controlled contact means includes contacts for marking the respective limit positions of travel of said slide, and means for adjustably disposing said limit position contacts.

11. In a pneumatic dispatch carrier system according to claim 1, comprising means forming a recess contiguous to said casing, said contact means controlled by said carrier being part of a contact spring of a contact disposed in said recess and extending into said bore of said slide through an opening formed in a wall of said casing, the carrier received in said bore of said slide actuating said contact, said slide maintaining said contact in actuated position for the duration of the interval of transferring said carrier to said outgoing dispatch tube and returning into receiving position in alignment with said incoming dispatch tube.

12. In a pneumatic dispatch carrier system according to claim 1, comprising means forming a contact recess contiguous to said casing, said contact means controlled by said carrier being part of a contact spring of a contact disposed in said recess and extending into said bore in said slide through an opening formed in a wall of said casing, the carrier received in said bore of said slide actuating said contact, said slide maintaining said contact in actuated position for the duration of the interval of transferring said carrier to said outgoing dispatch tube and returning into receiving position in alignment with said incoming dispatch tube, said contact means controlled by said slide being disposed in said recess and being operated thereby in the travel limit positions thereof, and cam means carried by said slide and extending into said recess through a slot formed in a wall of said casing for actuating said last named contact means.

13. In a pneumatic dispatch carrier system according to claim 2, wherein said nut is formed as a threaded bushing, and said screw spindle is provided with a thread only over a portion thereof, and spring means for holding the slide so that the thread of the screw spindle operatively engages the threaded bushing upon reversal of the direction of rotation of the thread of the screw spindle.

References Cited in the file of this patent

UNITED STATES PATENTS

| | | |
|---|---|---|
| 1,230,811 | Shippee | June 19, 1917 |
| 1,713,672 | Meyers | May 21, 1929 |
| 1,814,947 | McGuinness et al. | July 14, 1931 |
| 1,823,056 | Marburg | Sept. 15, 1931 |
| 1,923,052 | Chulstrom | Aug. 15, 1933 |
| 2,773,658 | Van Otteren et al. | Dec. 11, 1956 |

FOREIGN PATENTS

| | | |
|---|---|---|
| 304,437 | Germany | Mar. 14, 1918 |